US008572904B2

(12) United States Patent
Ali

(10) Patent No.: US 8,572,904 B2
(45) Date of Patent: Nov. 5, 2013

(54) NATURAL DISASTER SHELTER

(76) Inventor: Syed Z. Ali, Lexington, KY (US)

(*) Notice: Subject to any disclaimer, the term of this patent is extended or adjusted under 35 U.S.C. 154(b) by 0 days.

(21) Appl. No.: 13/561,970

(22) Filed: Jul. 30, 2012

(65) Prior Publication Data

US 2013/0031845 A1 Feb. 7, 2013

Related U.S. Application Data

(60) Provisional application No. 61/514,266, filed on Aug. 2, 2011.

(51) Int. Cl.
*E04H 9/14* (2006.01)
(52) U.S. Cl.
USPC .......................................... 52/79.1; 52/169.6
(58) Field of Classification Search
USPC ......... 52/79.1, 79.9, 169.6, 143; 49/366, 367; 220/4.21–4.25, 810; 244/129.5, 140, 244/137.1, 137.2, 137.3; 114/116–120
See application file for complete search history.

(56) References Cited

U.S. PATENT DOCUMENTS

| | | | | | |
|---|---|---|---|---|---|
| 544,773 | A | * | 8/1895 | Schill | 126/191 |
| 2,249,932 | A | * | 7/1941 | Beal | 49/109 |
| 2,752,114 | A | * | 6/1956 | Calvy | 244/118.3 |
| 2,806,666 | A | | 9/1957 | Brown | |
| 3,147,942 | A | * | 9/1964 | Griffith | 244/118.3 |
| 4,024,671 | A | * | 5/1977 | Isobe | 49/104 |
| 4,441,754 | A | * | 4/1984 | Hantel | 296/51 |
| 4,523,730 | A | * | 6/1985 | Martin | 244/122 R |
| 4,593,870 | A | * | 6/1986 | Cronkhite et al. | 244/117 R |
| 4,631,038 | A | | 12/1986 | Ritter | |
| 4,955,166 | A | | 9/1990 | Qualline | |
| 5,749,181 | A | * | 5/1998 | Bauman | 52/169.6 |
| 5,956,907 | A | | 9/1999 | Martin | |
| 6,085,475 | A | * | 7/2000 | Parks et al. | 52/169.6 |
| 6,308,466 | B1 | | 10/2001 | Moriarty | |
| 6,349,508 | B1 | * | 2/2002 | Ju et al. | 52/79.1 |
| 6,378,939 | B1 | * | 4/2002 | Knoll et al. | 297/216.1 |
| 6,438,906 | B1 | * | 8/2002 | Komarowski et al. | 52/169.1 |
| 6,675,540 | B1 | * | 1/2004 | Rokes | 52/143 |
| 6,874,284 | B1 | * | 4/2005 | Hayward | 52/79.1 |
| 6,938,381 | B1 | * | 9/2005 | Villa | 52/79.1 |
| 7,234,277 | B2 | * | 6/2007 | Savin | 52/79.12 |
| 7,237,362 | B2 | * | 7/2007 | Bishop | 52/79.2 |
| 7,690,159 | B1 | * | 4/2010 | Arnold | 52/167.1 |
| 7,856,762 | B2 | * | 12/2010 | Deisenroth et al. | 52/79.1 |
| 7,963,482 | B2 | * | 6/2011 | Ashton et al. | 244/129.5 |
| 8,006,935 | B2 | * | 8/2011 | Wells et al. | 244/137.1 |
| 8,205,399 | B2 | * | 6/2012 | Ralston | 52/143 |
| 8,322,085 | B2 | * | 12/2012 | Plumley | 52/79.14 |
| 2004/0206015 | A1 | * | 10/2004 | Greenboim | 52/79.1 |

(Continued)

*Primary Examiner* — Robert Canfield
(74) *Attorney, Agent, or Firm* — Daniel Boudwin

(57) ABSTRACT

Disclosed is a secure shelter for housing at least one individual for a sustained period during and after a natural disaster event. The shelter comprises a hardened enclosure having a securable hatch access door, an interior cabin and at least one user seat with a full safety harness. Each seat is preferably attached to the enclosure walls and may include an energy attenuating connection, while life supporting elements within the cabin include lighting, air filtration and intake means, communication and locating means, storage for supplies, as well as a power supply for sustained and independent operation. The device is preferably positioned within the basement of a home and tethered to a structural wall, or alternatively is affixed to the ground using structural footings when in use outside of a mobile or trailer home. The device protects users and maintains a comfortable, survivable environment during and after a natural disaster event.

7 Claims, 5 Drawing Sheets

(56) References Cited

U.S. PATENT DOCUMENTS

| | | | |
|---|---|---|---|
| 2005/0108954 A1* | 5/2005 | Sola | 52/79.1 |
| 2006/0048458 A1* | 3/2006 | Donald et al. | 52/69 |
| 2006/0080936 A1* | 4/2006 | Dooley et al. | 52/745.21 |
| 2007/0022678 A1* | 2/2007 | Sempel | 52/169.6 |
| 2007/0251159 A1* | 11/2007 | Wagner | 52/19 |
| 2008/0244998 A1* | 10/2008 | Dooley et al. | 52/203 |
| 2009/0194637 A1* | 8/2009 | Ashton et al. | 244/129.5 |
| 2012/0192503 A1* | 8/2012 | Connell | 52/79.1 |
| 2012/0222367 A1* | 9/2012 | Wirtz | 52/79.1 |
| 2013/0014452 A1* | 1/2013 | Hill et al. | 52/79.1 |

* cited by examiner

| Safety | Comfort | Locating Means | Sustainability |
|---|---|---|---|
| Safety Seats<br>- Seatbelt harness<br>- Energy attenuating wall connection<br><br>Hardened outer shell structures<br><br>Securable hatch<br><br>Location Support Anchors<br>- Basement wall tether<br>- Structural footing | Environmental Controls<br>- Air Conditioning unit<br><br>Internal Lighting<br><br>Windows | Voice Communication<br>- Satellite Phone<br>- CB Radio<br><br>GPS Transponder | Oxygen Circulation<br><br>Storage for food<br><br>Storage for water<br><br>Battery Power and Power Generator |

FIG. 3

NATURAL DISASTER SHELTER

CROSS REFERENCE TO RELATED APPLICATION

This application claims the benefit of U.S. Provisional Application No. 61/514,266 filed on Aug. 2, 2011, entitled "Tornado Walnut." The patent application identified above is incorporated here by reference in its entirety to provide continuity of disclosure.

BACKGROUND OF THE INVENTION

1. Field of the Invention

The present invention relates to secure enclosures, safety cages and protective human shelters for use during a disaster event. More specifically, the present invention pertains to a human shelter for protecting individuals from flying debris, wind and severe weather conditions during a tornado or hurricane event, wherein the individuals may live in mobile homes, recreational vehicles or be unable to flee the area prior to the event.

Tornadoes, hurricanes and other extreme weather formations can quickly become devastating events that cause widespread property damage, power outages and life threatening situations for home owners. Those living in regions that are seasonally exposed to such formations may consistently be in danger, as perennial weather patterns create the environment for high winds, rain and hail that can destroy otherwise stable structures and shelters. Those particularly threatened are those living in mobile or trailer-type homes that are not permanently fixed to a foundation. These types of homes are easily damaged or completely displaced from their temporary foundations. Those individuals living in permanent residences are exposed to less risk, as they can flee to the relative safety of their basement; however they are not completely exempt from the dangers posed by more extreme tornado and hurricane storm systems. These systems involve tremendous energy that requires users to seek reinforced or below-ground shelter to avoid personal injury irrespective of their property sophistication, or further flee the area prior to the storm arriving.

Those unable or unwilling to flee an area in the path of a hurricane or large tornado must weather the storm by seeking secure shelter from the high winds and rain. The high winds create flying and falling debris, which can include significant structures such as portions of homes, broken branches and even airborne vehicles. The ability of a temporary or even permanent residence to absorb an impact from this type of debris source and at a significant velocity is almost nil; this can create situations that result in catastrophic damage to the home and expose the occupants to flying debris, wind and rain. The present invention relates to a hardened, secure shelter than forms a supplementary safety enclosure for permanent residences and a place to seek shelter for those in mobile or trailer homes. For those unwilling to flee, those who are unable to flee due to illness or injury, or further those with inadequate warning of the impending weather formation, the present structure provides a secure, sustainable environment to weather the storm, contact emergency responders thereafter and to safely protect occupants from airborne debris sources and the energy of the storm.

2. Description of the Prior Art

The instances and severity of high energy storm systems, and the frequency with which they create disaster areas seems to be increasing as weather patterns shift and the climate slowly changes. To combat concerns for personal welfare during these events, devices that have been developed in the prior art that relate to personal shelters and storm enclosures. These include devices that have been patented and disclosed in patent application publications, and generally relate to temporary or mobile-home specific enclosures that allow for temporary shelter during the storm event. These devices provide little in the way of communications and sustained living environments after the event, and further do not solve the existing needs specifically addressed by the present invention. The forgoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 6,308,466 to Moriarty discloses a temporary, lightweight and portable shelter to protect an individual or set of individuals from the effects of a tornado or hurricane. The device includes an enclosure having six sides forming a rectangular case comprising polycarbonate thermoplastic sides, a hinged door, ventilation, interior padding and a means to bolt the enclosure to a floor surface. A light source within the enclosure provides vision while therein, while the exterior of the device may include reflective tape and a strobe light for locating the enclosure after the storm event has cleared. A peephole is further provided as a means for occupants to peer out of the shelter and through which light may enter therethrough. The Moriarty device, while providing a shelter for human occupants during a storm, provides a rudimentary enclosure that is not well adapted to sustain life for prolonged periods after a storm event has cleared. The present invention provides an enlarged volume having safety seats, a means of communication for emergency responder to locate the individuals, and an interior large enough to store supplies and for the occupants to subside for several days. This allows the occupants to remain healthy in the event the storm has made it difficult to locate the shelter amongst debris and if the shelter hatch is blocked.

U.S. Pat. No. 5,956,907 to Martin is another such device that discloses a tornado escape capsule for a house trailer, comprising an opening formed within the floor of the trailer adapted to accept the escape capsule, wherein the capsule includes a ground engaging anchor and a tether between the anchor and the capsule. The tether may include a damper element or a spring element that retains the capsule position along the ground during the event, while the trailer home may not be particularly suited to withstand the high winds and debris formed during a tornado or hurricane event. Similar to the Moriarty device, padding is provided within the enclosure to protect occupants. However, the Martin device differs in intent and purpose from the present invention, wherein the present invention is intended to not only secure to a ground surface using structural footings, but also maintain the health of occupants over an extended period and allow ready locating of the enclosure after the storm event has cleared for emergency responders.

Finally, U.S. Pat. No. 4,955,166 to Qualline discloses an underground, spherical tornado shelter for storing supplies and housing individuals during a tornado event. A seat member attaches to the sidewall of the shelter, while a doorway access and downward steps provide access thereinto. A plurality of ground anchors affix the structure from its outer surface to the soil to prevent dislodgement during turbulent storms, while a vent means attaches to the upper portion of the structure to communicate fresh air thereinto. The device provides an enclosed structure that is suited to be buried beneath the ground surface for protection from violent storms. The structure and intent of the Qualline device diverges from the present invention, which provides a movable structure that is adapted to be positioned within a basement or alongside a mobile or trailer home.

The present invention comprises a secure shelter that houses at least one user in an enclosed cavity, wherein the cavity includes seats, restraints, life support elements, communication means and either a tethered connection for a basement unit, or alternatively a in-ground set of footings for use beside a mobile or trailer type home. The device is adapted to house the user or users within the chamber, provide fresh oxygen, lighting and sustenance for a several days in the event the storm event creates devastating conditions or the users become trapped. Communication means in the form of common band and satellite phones provide a means to contact emergency responders after the event. The elements and spirit of the present invention substantially diverge from the prior art, and consequently it is clear that there is a need in the art for an improvement to existing personal shelter devices. In this regard the instant invention substantially fulfills these needs.

SUMMARY OF THE INVENTION

In view of the foregoing disadvantages inherent in the known types of shelter devices now present in the prior art, the present invention provides a new storm and disaster shelter wherein the same can be utilized for providing convenience for the user when protecting at least one occupant, sustaining the occupant for several days and providing a means to locate the shelter after an event.

It is therefore an object of the present invention to provide a new and improved shelter device that has all of the advantages of the prior art and none of the disadvantages.

It is another object of the present invention to provide a shelter device that provides a hardened, outer shell formed of sidewalls, a hingeable and securable latch, an upper and lower surface and means of securing the shelter in place.

Another object of the present invention is to provide a shelter device that provides safety seats having harnesses and optional energy attenuating connections for the users in the shelter to sit and be secured into during the weather event.

Yet another object of the present invention is to provide a shelter device that provides life sustaining capabilities in the event large scale damage to the surrounding areas causes delays in receiving fresh supplies or access to rescue personnel.

Another object of the present invention is to provide a shelter device that includes communication means, storage for food, water and supplies, a means of circulating in fresh oxygen, cabin environmental controls for regulating temperature, internal lighting for occupants and finally a means to locate the shelter amongst debris using a transponder device.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 3 shows a list of features provided in the preferred embodiment of the present invention for protecting and sustaining occupants during and after an extreme weather event.

DETAILED DESCRIPTION OF THE INVENTION

Figure 1:
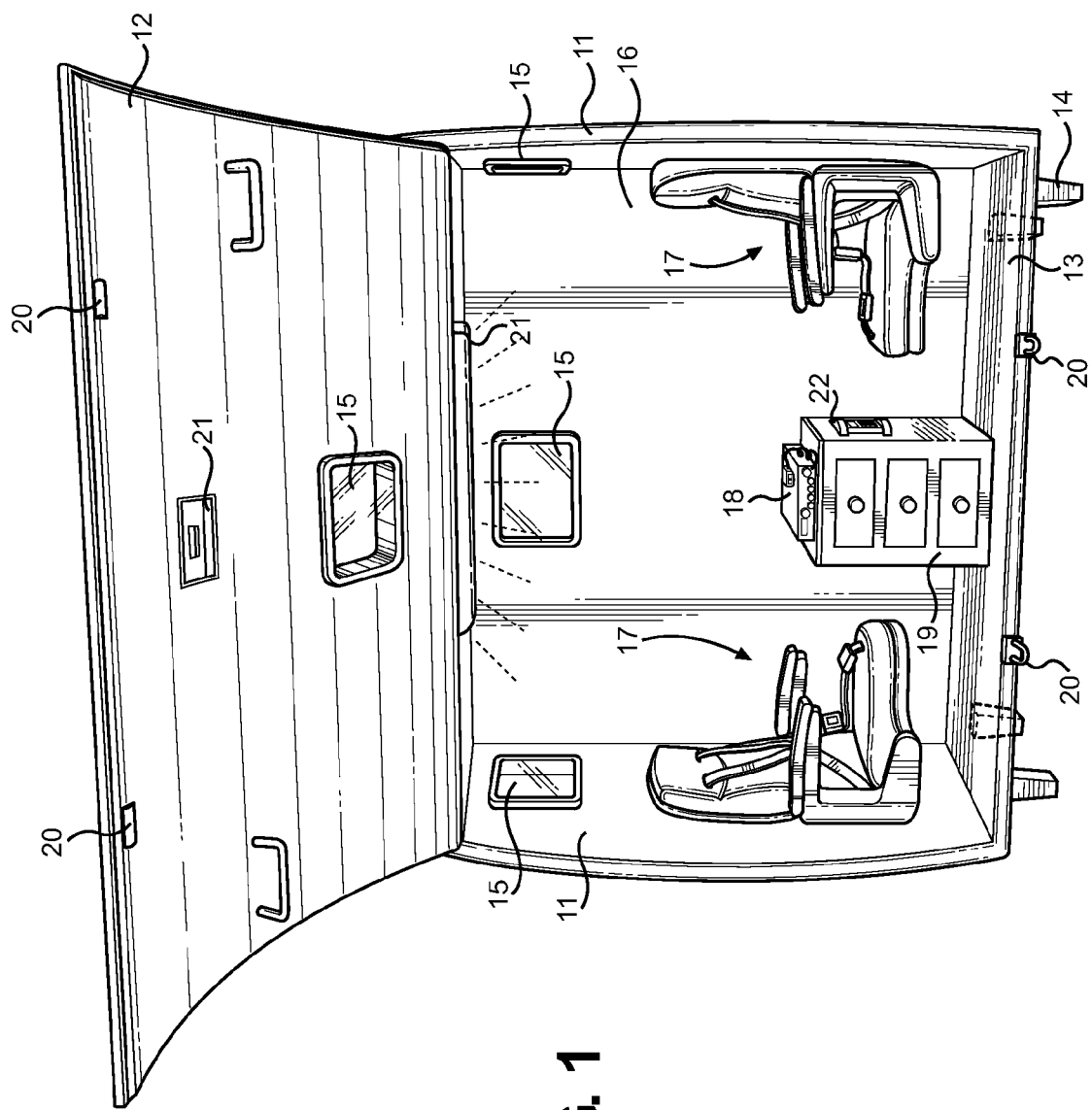
FIG. 1 shows a perspective view of the present invention in a two occupant configuration.

Reference is made herein to the attached drawings. Like reference numerals are used throughout the drawings to depict like or similar elements of the shelter device. For the purposes of presenting a brief and clear description of the present invention, the preferred embodiment will be discussed as used for sheltering one or more occupants during a weather event and sustaining the occupants over a period of time thereafter and facilitating contact with emergency responders. The figures are intended for representative purposes only and should not be considered to be limiting in any respect.

Figure 2:
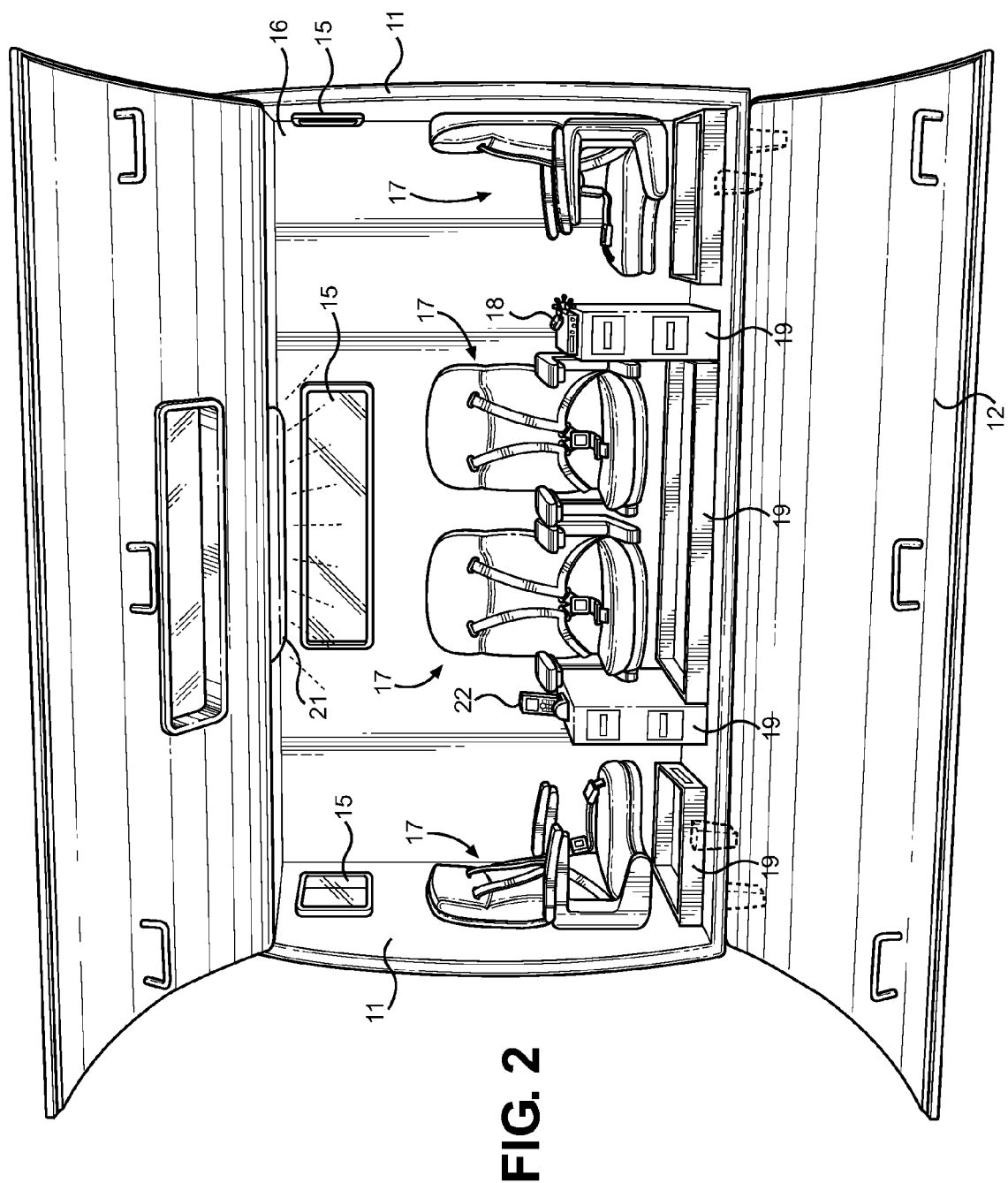
FIG. 2 shows a perspective view of the present invention in a four occupant configuration.

Referring now to FIGS. 1 and 2, there are shown perspective views of the present invention in a two and four-occupant configuration. The shelter comprises an enclosed housing having sidewalls 11, a floor and ceiling, along with a back wall 16 and an opposing sealable hatch door 12. The structure of the device is one that resists penetration and can absorb impacts from flying debris, such that the walls of the device create a structural cage about the occupants to protect them from falling debris and collapsing structure around them. Within the shelter is at least one occupant seat 17, which comprises a wall-mounted assembly having a seat bottom, seat back and armrests. The occupant is secured within the seat 17 via a seat belt style restraints or harness that prevents the occupant from being dislodged from the seat 17 in the event the shelter is impacted and shifts suddenly. In addition to the restraints, the structure of the seat may further be shock-mounted to the walls of the shelter so as to absorb and attenuate accelerations into the cabin, which could cause injury if the entire shelter were to be impacted.

Along the walls of the device are preferably shockproof and reinforced windows 15 that allow natural light to enter the interior of the structure. Interior lighting 21 is provided along the ceiling to allow occupants to see within the shelter in low light or nighttime conditions. Also within the shelter interior is storage space 19 for placement of food, water, supplies and blankets if necessary for prolonged sustainment of the occupants after a strong weather condition. In the event that the surrounding areas are devastated, the occupants are unable to exit the shelter due to debris or if traveling outside is hazardous due to the storm aftermath, it is desired to allow storage of water and sustenance such that emergency responders and personnel may reach the occupants in the shelter to assist them or clear debris for them to open the hatch door 12 without obstruction. The hatch 12 itself is a hingeable and securable door that is securable using structural door latches 20, wherein users can secure the hatch 12 closed and lock it into a closed position using a locking mechanism and handle 21.

Once inside the shelter and after the hatch 12 has been secured, the internal environment of the shelter is controllable using environmental controls. These include a fresh air circulation system that draws in fresh air through an air filter and removes air from within the shelter to prevent excess carbon dioxide development. Further, an air conditioning system is provided that utilizing a refrigeration cycle to create cooling air that is blown throughout the cabin, which is necessary in areas of high heat or after the latch is closed and the temperature within the cabin rises due to body heat. To maintain the occupant comfort, prevent anxiety and relaxation, a cooling system is necessary. Powering all auxiliary and sustainment systems within the cabin is a battery pack and gas generator, which is secured along the backside of the enclosure and behind a wall to shroud the occupants therefrom. The gas generator creates power by turning a generator, which can power the batteries or run the environmental and lighting systems directly, depending on the design of the electrical systems.

To allow the users to be found after a storm event, it is desired to disclosed communication and location means within the enclosure that facilitate emergency responder communication and location of the occupants amongst built-up debris. The communication means includes at least a common band (CB) radio system 18 and a satellite phone 22 communication system, which allows outgoing and incoming communication between occupants and rescue workers after the event. Further provided is a global positioning system (GPS) transponder, which communicates with satellites to pinpoint the location of the shelter after the storm, which may be difficult to readily find amongst other debris. The satellite phone antenna and GPS transponder may be located along the top of the shelter in a secure location such that they are not readily damaged during the storm event. Finally, a high intensity flashing light may be positioned along the sides or top of the shelter to provide a visual indicator of the shelter amongst debris and during periods of low light. It is desired to disclose several locating and communication systems such that occupants are readily locatable after the storm event, since it is submitted that falling debris and mass damage to property can easily entrap the occupants or make it difficult to locate the occupants in the event of injury.

The base of the shelter is one that can take several embodiments depending on the intended use and the environment with which the shelter is placed. Structural footings, a wheeled base or simple support legs 14 may position the shelter on a level surface. The latching door 12 is one that creates a watertight seal to prevent unwanted infiltration of water in the event of rain exposure and flooding. After the storm has cleared, the latching handle 21 of the door 12 can be unlocking to break the seal and allow water into the cabin. This may be necessary if the area surrounding the shelter is flooded and pressure from the standing water is preventing the occupants from easily opening it. The unsealing of the cabin door allows water to infiltrate the cabin for the purpose of equalizing the pressure across the door and allow the door to be opened. This is only done as a last resort when leaving the cabin, as the interior is flooded and supplies may be ruined. However, the occupants are not permanently trapped within the cabin in the vent of high flooding in the area.

Referring now to FIG. 2, there is shown an embodiment of the present invention that contemplates four occupant seats and a larger interior volume for storage. The interior of the cabin is designed to allow the users to comfortably sit within their own seats and restraints, while further allowing storage for food, water and supplies. Controls may be positioned within the interior to control the gas generator, lights, communication and locating means, and further environmental controls. Interior ducting or direct vents from the air conditioner circulate cool air, while a fresh air circulation system draws fresh air into the cabin through the air conditioner and bypasses the air conditioner for direct, ambient air if the air conditioner is not being utilized. The inlet for the air conditioner and fresh air duct may be positioned along the top of the shelter to prevent flooding conditions from interfering or clogging the intake. The intake is one that preferably does not extend outwards from the shelter, which prevents debris from interfering with its intended operation.

Referring now to FIG. 3, there is shown a diagram listing the critical safety and sustainability features of the shelter. These features are separated into four primary categories, including: safety, comfort, locating means and sustainability. Safety elements are those that are directly related to shielding the occupants and preventing injury during the storm event. These are the structure of the enclosure, securable latch that creates a watertight seal, the occupant safety seats with harnesses, and further the anchoring system of the overall assembly to a ground or basement structure. The comfort elements include those that maintain occupant comfort during and after the event, including environmental controls (air conditioning and air movement), internal lighting and external vision through the cabin windows. The windows allow ambient light to enter, and further allow the occupants to visualize conditions outside of the shelter, which allows the occupants to decide when to leave the shelter, assess conditions after the event (hazards, etc), and further to reduce anxiety related to claustrophobia. The third set of elements include the locating means of the shelter, which is a broad category of communication, locating and rescue coordination after the event has ended. If the occupants are trapped, if occupants are injured or if evacuation is necessary, voice communication is provided within the shelter and a GPS positioning means is also provided to pinpoint the occupant shelter location amongst debris, wherein landmarks may no longer be available for locating their position. Finally, the sustainability elements of the present invention include those elements that prevent exposure while allowing independent operation of the shelter for a period of time after the storm event. These include storage for food, water, blankets and supplies, and further to the power-generating elements of the shelter, such as the power generator and optional battery pack. Power generation is necessary for powering the lights, communication and locating means, and the environmental controls. It is submitted that storms of even mild magnitude cause widespread power loss, particularly in areas of above ground power transmission lines. Therefore, adequate local power generation is necessary for sustaining occupants for days after the event.

Figure 4:
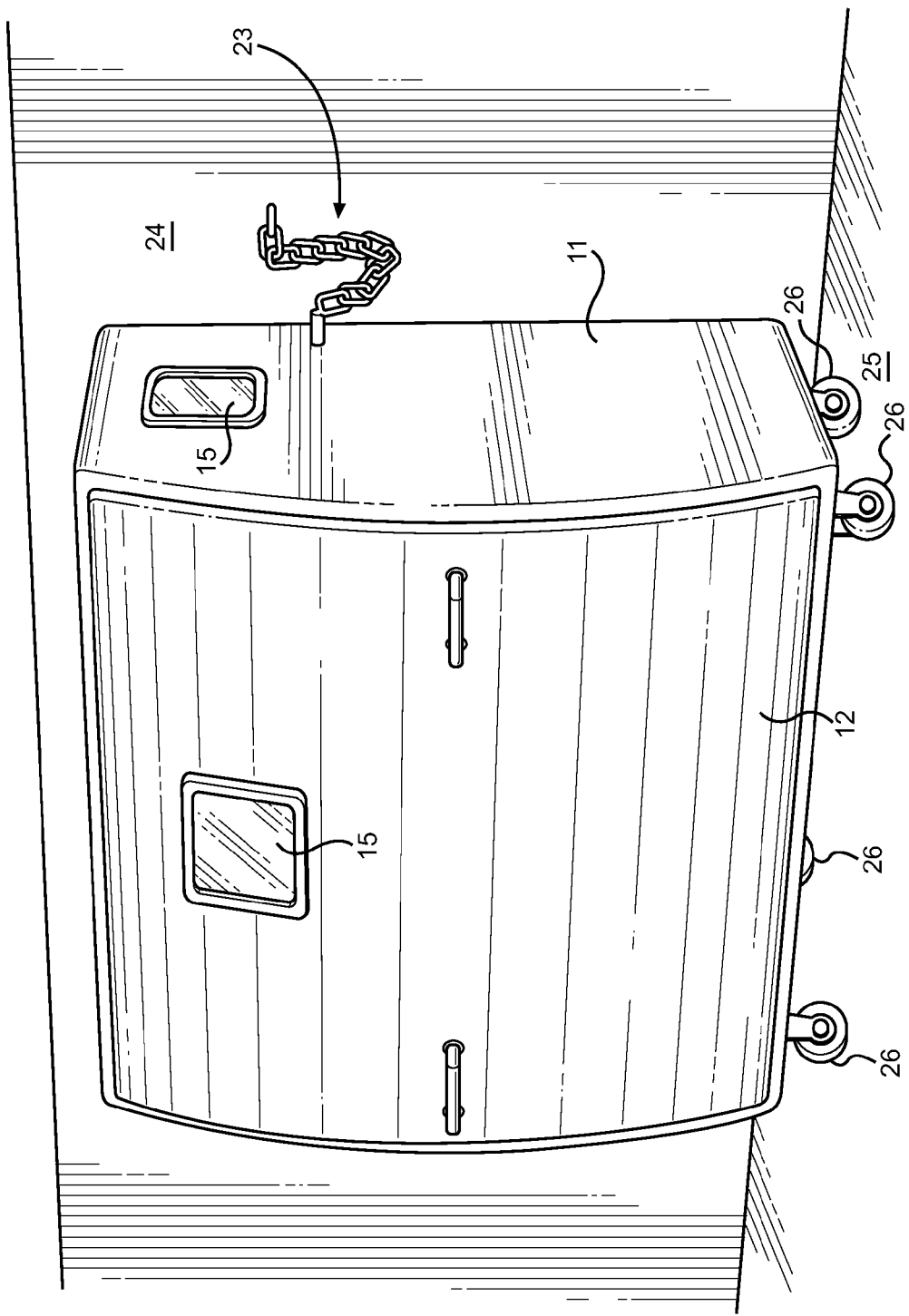
FIG. 4 shows an exterior view of the present invention in the basement of a permanent residence, tethered to the basement wall as an anchoring system.
Figure 5:
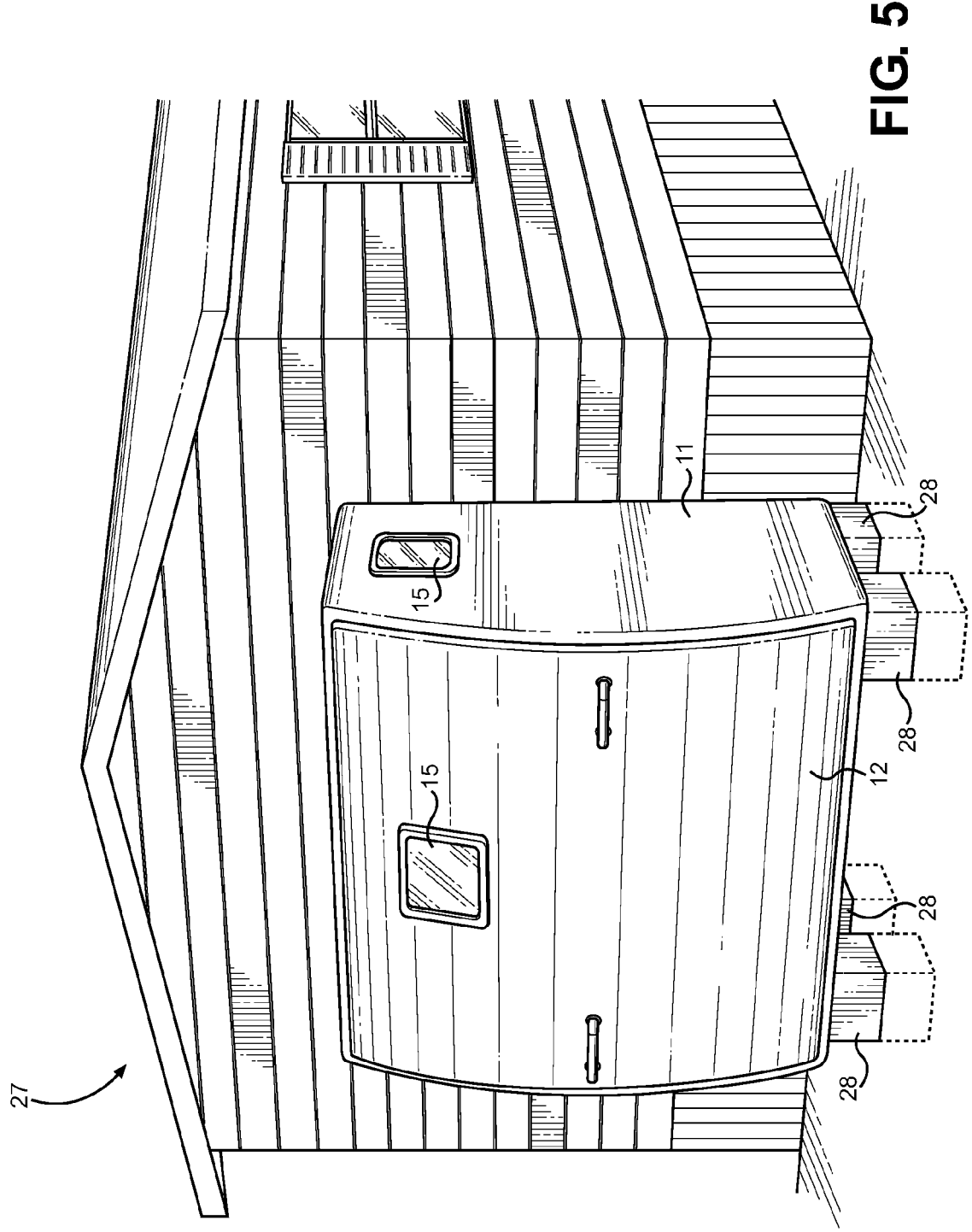
FIG. 5 shows an embodiment of the present invention in use with a temporary or trailer type home, wherein the shelter is secured to foundations within the ground.

Referring now to FIGS. 4 and 5, there are two embodiments of the shelter anchoring system and two possible locations of the shelter. In FIG. 4, there is shown an embodiment that includes a wall tether 23 and rollable supports 26 under the shelter. This embodiment is designed for use within the basement of a permanent residence, where the basement provides a secure foundation that shrouds the enclosure sufficiently that more rigorous support is not required. The device can be set up in the corner of the basement and tether to the basement wall 24, while roller wheels support the shelter along the basement floor 25. Locating the shelter against an upstanding structural support for the dwelling places the shelter way from areas that are prone to structural collapse during stronger storms, such as open and unsupported regions of the upper floors. Referring now to FIG. 5, there is shown an embodiment of the shelter anchoring system that contemplates in-ground structural footings 28, which statically support the shelter in a stable position. This configuration is utilized when the shelter is placed outdoors, or in conjunction with a temporary, trailer-type or motor home dwelling. These types of homes are not as stable or as structurally sound as permanent residences, and therefore are more prone to displacement and complete destruction during severe weather events. Therefore, a grounded, structurally supported shelter provides users with a means of shelter even if their home is not sufficiently design for withstanding high winds and flying debris.

The structure of the shelter is one of reinforced and structurally sound material and design, wherein the broad surfaces of the shelter are prevented from deformation due to airborne debris impacts, and further the shelter is structurally sufficient to prevent collapse from intermediately sized falling trees or the device tipping. This hardened structure, along with the safety seats, restraints and attenuating seatbacks, provides occupants with sufficient shielding and protection from airborne and falling debris, and further restrains the occupants if the entire structure tips or dislodges. The structural footings of the outdoor embodiment are designed to prevent displacement; however the safety seats of the interior are designed to prevent injury in the event of their failure. In this way, the occupants are prevented during the storm, whereafter the sustaining elements of the device provide a means to stay healthy after the event and be located by emergency personnel.

During hurricanes, tornadoes, and other periods of severe weather, individuals are often instructed to retreat to their basements for shelter or leave the area before the storm arrives. However, many individuals may live or work in residences lacking basements, and therefore may have no safe place to hide. Further, some individuals may be incapable or unwilling to leave their dwelling prior to the storm. If not sufficiently protected, these individuals can be exposed to the hazards of the storm, including flying and falling debris, extreme gusts of wind, rain and flooding, which can result in severe injuries or death. Families may also be separated when scrambling to find sufficient shelter. The present invention is therefore provided as a means of homeowners and individuals to obtain their own shelter, which is deployable in a number of different environments and may accommodate several occupants. The present invention provides a means of protection during the storm event, while further sustaining the occupants after the event and allowing their location by rescue workers and emergency responders. The goal is to prevent injury and means of shelter when sufficient protection is not afforded by the individual's home, and in particular shelter for those in areas of perennial tornadoes, hurricanes or other extreme weather conditions.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A storm and natural disaster shelter, comprising:
   an enclosure having at least one occupant seat, an interior defined by a floor, ceiling and sidewalls, said at least one occupant seat secured to and extending from an interior portion of at least one of said side walls, and a hatch for access into said interior, wherein said hatch forms one of said sidewalls and comprises an upper and lower portion that removably secure together along a central line of connection to close said hatch;
   said hatch creating watertight, lockable seal when closed;
   said at least one occupant seat comprising occupant restraints;
   said sidewalls having at least one window to allow ambient light to pass therethrough;
   said interior further comprising internal lighting, communication means for contacting individuals outside of said shelter, a locating means for providing said shelter location and environmental controls for circulating fresh air through said interior;
   a means of power generation for powering said lighting, communication means, locating means and said fresh air circulation;
   said shelter structure comprising of a hardened material to resist puncturing and deformation from falling or flying debris impacts; and wherein said shelter further comprises structural footing that secure a base of said shelter to a ground or foundation.

2. The device of claim 1, further comprising an air conditioner, wherein cool air is generated through a refrigeration cycle and circulated through said interior.

3. The device of claim 1, wherein said communication means further comprises a common band radio.

4. The device of claim 1, wherein said communication means further comprises a satellite phone.

5. The device of claim 1, wherein said locating means further comprises a global positioning system (GPS) transponder.

6. The device of claim 1, wherein said interior further comprises storage for food, water and supplies.

7. The device of claim 1, further comprising a battery pack energy storage means.

* * * * *